United States Patent [19]

Umemura

[11] Patent Number: 5,050,697

[45] Date of Patent: Sep. 24, 1991

[54] STEERING APPARATUS FOR AUTOMOTIVE VEHICLE

[75] Inventor: Atsushi Umemura, Susono, Japan

[73] Assignee: Toyota Jidosha Kabushiki Kaisha, Toyota, Japan

[21] Appl. No.: 591,519

[22] Filed: Oct. 2, 1990

[30] Foreign Application Priority Data

Oct. 2, 1989 [JP] Japan .................................. 1-115960

[51] Int. Cl.$^5$ .......................... B62D 5/06; B62D 5/04
[52] U.S. Cl. .................................... 180/141; 180/79.1; 180/79.3; 180/148; 74/388 PS; 74/437; 74/498
[58] Field of Search ............. 180/141, 142, 143, 79.3, 180/133, 148, 79.1; 74/388 PS, 498, 422, 437

[56] References Cited

U.S. PATENT DOCUMENTS

| | | | |
|---|---|---|---|
| 3,511,104 | 4/1968 | Piat | 74/388 PS X |
| 3,774,568 | 11/1973 | Borst et al. | 74/498 X |
| 3,823,617 | 7/1974 | Infanger et al. | 74/498 |
| 3,844,181 | 10/1974 | Bayle | 74/498 |
| 4,573,705 | 3/1986 | Kanai et al. | 180/141 X |
| 4,658,927 | 4/1987 | Kanazawa | 180/141 X |
| 4,715,462 | 12/1987 | Taig | 180/79.1 |
| 4,932,492 | 6/1990 | Sauvageot et al. | 74/388 PS X |
| 4,956,590 | 9/1990 | Phillips | 180/142 X |

Primary Examiner—Richard A. Bertsch
Assistant Examiner—Kevin Hurley
Attorney, Agent, or Firm—Cushman, Darby & Cushman

[57] ABSTRACT

A steering apparatus capable of changing a steering angle ratio of dirigible road wheels relative to a rotation amount of a steering wheel. The steering apparatus includes an input member arranged to be operatively connected to the steering wheel, a support shaft coaxially arranged with the input member and being interconnected with the input member for relative rotation on aligned axes, an output pinion rotatably mounted on the support shaft and being in mesh with the toothed portion of a rack member for operative connection with the dirigible road wheels, and a differential gear mechanism including an input sun gear mounted on the support shaft at a position adjacent the output pinion, first and second planetary gears respectively in mesh with the input sun gear and the output pinion and being rotatably mounted on a common shaft, and a carrier supporting thereon the common shaft and being arranged to be rotated about the support shaft.

5 Claims, 2 Drawing Sheets

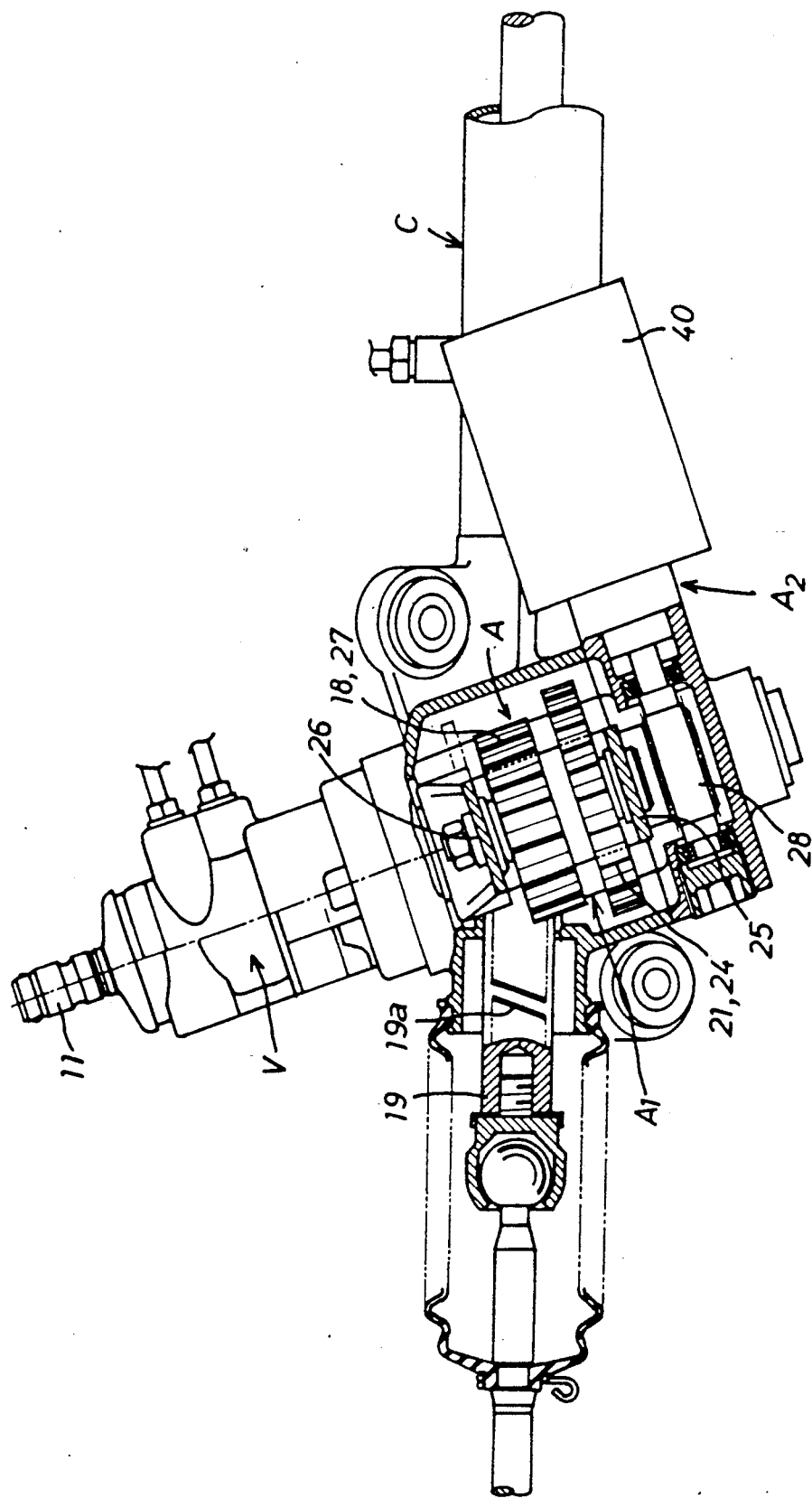

STEERING APPARATUS FOR AUTOMOTIVE VEHICLE

BACKGROUND OF THE INVENTION

1. Field of the Invention

The present invention relates to a steering apparatus adapted for use in automotive vehicles, and more particularly to a steering apparatus capable of changing a steering angle ratio of dirigible road wheels relative to a rotation amount of a steering wheel from its neutral position.

2. Description of the Prior Art

In Japanese Patent Early Publication No. 60-209362, there is disclosed a steering apparatus of this kind which includes an input member arranged to be operatively connected to a steering wheel, an output member arranged coaxially with the input member and being integrally formed with an output pinion in mesh with the toothed portion of a rack member for operative connection with a set of dirigible road wheels, an intermediate member interposed between the input and output members and being interconnected with the output member for rotation therewith, and a differential gear mechanism including input and output sun gears different in the number of teeth respectively mounted on the input and intermediate members for rotation therewith and planetary gears different in the number of teeth respectively meshed with the sun gears, the planetary gears being coaxially united and rotatably supported by a common carrier which is rotatably mounted on the input and intermediate members to be driven by an input torque applied thereto from a drive mechanism.

In the steering apparatus described above, the differential gear mechanism is assembled in a position axially spaced from the output pinion. As a result, the axis of the rack member is spaced in a large distance from the lower end of the input member. In such arrangement of the differential gear mechanism, the following problems will be raised when the steering apparatus is mounted to the vehicle body structure.

1) In general, the rack member must be arranged in a limited position to minimize the change of wheel alignment caused by vertical movement of the vehicle suspension. For this reason, the arrangement of the rack member may not be lowered even if a sufficient space is obtained below the input member of the steering apparatus.

2) In general, a steering wheel is mounted on a main shaft which is operatively connected to the input member of the steering apparatus by means of an intermediate shaft and two axially spaced universal joints to eliminate fluctuation of the driver's effort applied to the steering wheel. If the input member of the steering apparatus is raised to arrange the rack member in a desired position, the driver's steering feel will be deteriorated due to fluctuation of his effort.

SUMMARY OF THE INVENTION

It is, therefore, a primary object of the present invention to provide an improved steering apparatus wherein the distance between the lower end of the input member and the axis of the rack member can be reduced as small as possible to avoid the problems described above.

According to the present invention, the primary object is attained by providing a steering apparatus for an automotive vehicle which comprises an input member arranged to be operatively connected to a steering wheel, a support shaft coaxially arranged with the input member and being interconnected with the input member for relative rotation on aligned axes, an output pinion rotatably mounted on the support shaft and being in mesh with the toothed portion of a rack member for operative connection with a set of dirigible road wheels of the vehicle, and a differential gear mechanism including an input sun gear mounted on the support shaft at a position adjacent the output pinion, first and second planetary gears respectively in mesh with the input sun gear and the output pinion and being rotatably mounted on a common shaft, and a carrier supporting thereon the common shaft and being arranged to be rotated about the support shaft. Preferably, a drive mechanism is associated with the differential gear mechanism to rotate the carrier about the support shaft in accordance with a travel speed of the vehicle and a rotation angle of the steering wheel.

BRIEF DESCRIPTION OF THE DRAWINGS

Other objects, features and advantages of the present invention will be readily appreciated from the following detailed description of a preferred embodiment thereof when taken together with the accompanying drawings, in which:

FIG. 2 is a partly broken side view of the steering apparatus.

DESCRIPTION OF THE PREFERRED EMBODIMENT

Figure 1:
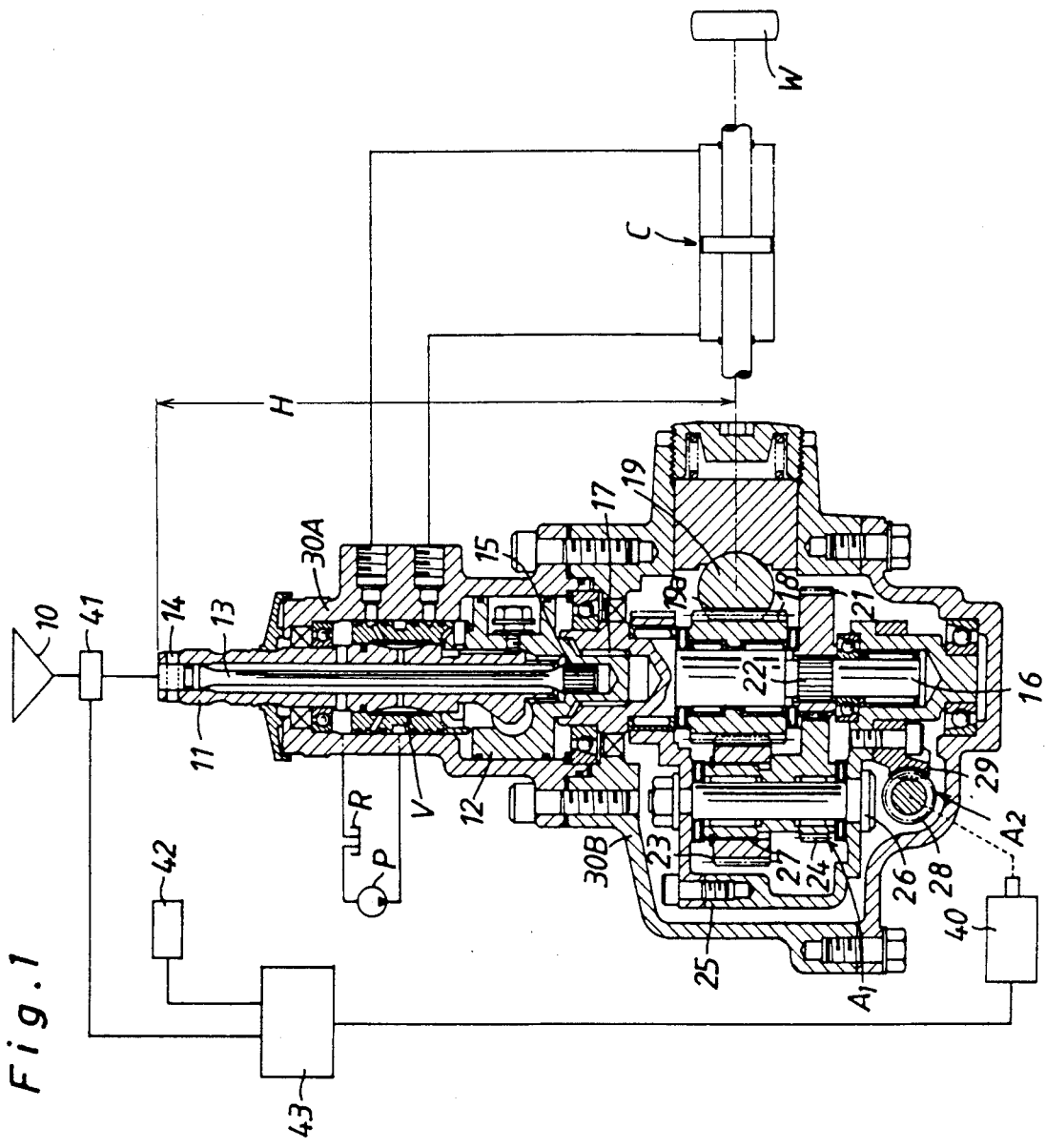
FIG. 1 is a sectional view of a power-assisted steering apparatus of the rack-and-pinion type in accordance with the present invention.

In FIG. 1 of the drawings, there is illustrated a power-assisted steering apparatus of the rack-and-pinion type in accordance with the present invention, wherein input and intermediate members 11 and 12 are rotatably mounted within a valve housing 30A and interconnected by means of a torsion bar 13 for relative rotation on aligned axes. The input member 11 is in the form of a hollow shaft arranged to be operatively connected in a usual manner to a steering wheel 10 by means of a main shaft, an upper universal joint, an intermediate shaft and a lower universal joint (not shown). The input member 11 is connected to the upper end of torsion bar 13 by means of a lateral pin 14, while the intermediate member 12 is connected to the lower end of torsion bar 13 at its serrated portion 15. Within the valve housing 30A, a changeover valve V is provided in a usual manner to control hydraulic fluid under pressure supplied into a power cylinder C from a hydraulic pump P in accordance with relative rotation of the input and intermediate members 11 and 12.

The intermediate member 12 is splined at 17 to the upper end of a support shaft 16 which is coaxially arranged with the intermediate member 12 and rotatably mounted within a gear housing assembly 30B by means of a pair of axially spaced ball bearings. The support shaft 16 is provided thereon with an output pinion 18 which is rotatably carried by a pair of radial bearings and a pair of axially spaced thrust bearings and permanently meshed with the toothed portion 19a of a rack member 19. The rack member 19 is formed as an intermediate portion of a piston rod of the power cylinder C which is operatively connected in a usual manner to a set of dirigible road wheels W by means of a steering linkage (not shown). As shown in FIG. 2, the input and intermediate members 11, 12 and support shaft 16 are arranged to be inclined at a predetermined angle with respect to the rack member 19.

Arranged at the lower end portion of support shaft 16 is a differential gear mechanism A1 which includes an oval input sun gear 21 splined at 22 to the support shaft 16 for rotation therewith, an oval planetary gear 24 in mesh with the input sun gear 21 and a circular planetary gear 23 in mesh with the output pinion 18. The planetary gear 24 is rotatably mounted on a common shaft 26 through a pair of radial bearings and a pair of axially spaced thrust bearings, and the common shaft 26 is supported by a carrier 25 which has one end rotatably mounted on the gear housing assembly 30B through a ball bearing and the other end rotatably mounted on the support 16 by means of a radial bearing. The circular planetary gear 23 is mounted on a sleeve portion of planetary gear 24 at its internally serrated portion 27 for rotation therewith.

The differential gear mechanism A1 is associated with a drive mechanism A2 which includes an electric motor 40 assembled with the gear housing assembly 30B to rotate the carrier 25 about the support shaft 16. As shown in FIG. 2, the electric motor 40 has an output shaft in drive connection to a worm shaft 28 rotatably mounted within the gear housing assembly 30B by means of a pair of axially spaced bearings. The worm shaft 28 is in mesh with a worm wheel 29 mounted on the one end of carrier 25 for rotation therewith. As shown in FIG. 2, the electric motor 40 is arranged to be overlapped with the power cylinder C in a condition where the steering apparatus has been mounted in place. As shown in FIG. 1, the electric motor 40 is in the form of a reversible motor to be activated or deactivated under control of a controller 43 connected to a steering angle sensor 41 for detecting a rotation amount or angle of the steering wheel 10 and to a speed sensor 42 for detecting a travel speed of the vehicle. In this embodiment, the controller 43 is responsive to electric signals from the sensors 41 and 42 to cause rotary motion of the carrier 25 in accordance with the travel speed of the vehicle and the rotation amount of the steering wheel 10 under control of the electric motor 40.

In the steering apparatus described above, the output pinion 18 in mesh with the toothed portion 19a of rack member 19 is provided on the support shaft 16 which is located below the intermediate member 12, and the differential gear mechanism A1 is arranged below the output pinion 18. With such arrangement of the differential gear mechanism A1, the height H of the upper end of input member 11 from the axis of rack member 19 can be lowered to facilitate installation of the steering apparatus to the vehicle body structure. In the differential gear mechanism A1, the output pinion 18 is adapted as an output sun gear in mesh with the circular planetary gear 23, and the pair of sun and planetary gears 18, 23 is located at the same level as the rack member 19. This is useful to provide the differential gear mechanism A1 in a small construction at a low cost.

Assuming that the input member 11 has been rotated by the driver's effort applied to the steering wheel 10, the torsion bar 13 causes the intermediate member 12 and support shaft 16 to rotate in accordance with the rotation amount of input member 11. The rotation of support shaft 16 is transmitted to the output pinion 18 through the input sun gear 21 and planetary gears 24, 23 to cause axial movement of the rack member 19. Simultaneously, the power cylinder C is operated under control of the changeover valve V to assist the axial movement of rack member 19. Thus, the dirigible road wheels W are steered in response to the axial movement of rack member 19. In this instance, the steering ratio of the dirigible road wheels W relative to the rotation amount of the steering wheel 10 is determined by the gear ratios between the sun and planetry gears 21, 24 and between the planetary gear 23 and output pinion 18 and adjusted by rotation of the carrier 25 caused by activation of the electric motor 40 under control of the controller 43.

Although in the above-described embodiment the sun and planetary gears 21, 24 each are in the form of an oval gear, a circular gear may be adapted as the sun and planetary gears 21, 24, respectively. In a practical embodiment of the present invention, the steering apparatus may be constructed without the provision of the changeover valve V.

What is claimed is:

1. A steering apparatus adapted for use in an automotive vehicle, comprising:
   an input member arranged to be operatively connected to a steering wheel;
   an intermediate member coaxially arranged with said input member and being interconnected with said input member for relative rotation on aligned axes;
   a support shaft coaxially arranged with said intermediate member and being connected with said intermediate member for rotation therewith;
   an output pinion rotatably mounted on said support shaft and being in mesh with the toothed portion of a rack member for operative connection with a set of dirigible road wheels of the vehicle; and
   a differential gear mechanism including an input sun gear mounted on said support shaft at a position adjacent said output pinion, first and second planetary gears respectively in mesh with said input sun gear and said output pinion and being rotatably mounted on a common shaft, and a carrier supporting thereon said common shaft and being arranged to be rotated about said support shaft.

2. A steering apparatus as claimed in claim 1, further comprising a drive mechanism associated with said differential gear mechanism to rotate said carrier about said support shaft in accordance with a travel speed of the vehicle and a rotation angle of said steering wheel.

3. A steering apparatus as claimed in claim 1, wherein said input sun gear and said first planetary gear each are in the form of an oval gear.

4. A steering apparatus as claimed in claim 1, wherein said input sun gear is located below said output pinion.

5. A steering apparatus as claimed in claim 1, wherein said input and intermediate members and said support shaft are arranged to be inclined at a predetermined angle with respect to said rack member.

* * * * *